United States Patent Office 3,267,109
Patented August 16, 1966

3,267,109
3,5-PYRIDINEDISULFONIC ACID
Bernard F. Duesel, Yonkers, and Louis S. Scarano, Middletown, N.Y., assignors to Nepera Chemical Co., Inc.
No Drawing. Filed Jan. 15, 1964, Ser. No. 337,715
7 Claims. (Cl. 260—294.8)

This invention relates to an improved method for the preparation of 3,5-pyridinedisulfonic acid by controllably reacting pyridine with sulfur trioxide in the presence of certain sulfonation catalysts.

Although numerous references have been made in the literature to methods for preparing 3-pyridinesulfonic acid, only a very few references have appeared which are directed to a method for the preparation of 3,5-pyridinedisulfonic acid. One such literature reference (J. Chem. Soc., vol. 93, page 1997) describes the preparation of 3,5-pyridinedisulfonic acid by heating piperidine with ten times its weight of sulfuric acid which is thereafter distilled from the reaction mixture and the diacid formed is isolated as a barium salt.

Machek, Monatshefte fur Chemie, 73, 180–6 (1940), investigated the sulfonation of piperidine to 3,5-pyridinedisulfonic acid and found that only a minor portion of piperidine is converted to pyridine while the major portion is destroyed with the formation of ammonium sulfate. In order to obtain a reasonably pure 3,5-pyridinedisulfonic acid in noticeable yields, it was found necessary to chlorinate the crude acid with phosphorous pentachloride and liberate the free acid after the double recrystallization of 3,5-pyridinedisulfonylchloride. Since the yield of the purified acid is generally less than about 30% of the crude and usually about 10%, Machek concluded from his study that the sulfonation of piperidine to 3,5-pyridinedisulfonic acid is not a useful method. Attempts by Machek to alter these results primarily through the use of 20% oleum with various catalysts by varying temperatures and pressure conditions failed to substantially improve these yields.

It has now been found, however, that in the preparation of 3,5-pyridinedisulfonic acid, it is not necessary to start with expensive piperidine but that pyridine may be sulfonated with sulfur trioxide in the presence of certain sulfonation catalysts. It has also been found that the product so produced may be readily extracted in high yields from the reaction mixture by crystallization in an alcohol-water ice bath.

An object of this invention, therefore, is to provide a method for the preparation of 3,5-pyridinedisulfonic acid by controllably reacting sulfur trioxide with pyridine in the presence of certain sulfonation catalysts.

Another object of this invention is to provide a commercially feasible method for the preparation of 3,5-pyridinedisulfonic acid by controllably reacting sulfur trioxide with pyridine in the presence of mercury as a catalyst.

A further object of this invention is to provide a commercially feasible method for the preparation of 3,5-pyridinedisulfonic acid by the controlled sulfonation of 3-pyridinesulfonic acid in the presence of mercury as a catalyst.

Another object of this invention is to provide a commercially feasible method for the extraction of 3,5-pyridinedisulfonic acid from a reaction mixture by crystallization in an alcohol-water ice bath.

Other objects and advantages of this invention will become apparent from the following detailed description.

It has now been found that 3,5-pyridinedisulfonic acid may be obtained in substantially higher yields than by methods previously used hereto by reacting either pyridine or 3-pyridinesulfonic acid with sulfur trioxide in the presence of certain sulfonation catalysts. Although pyridine is the preferred initial reactant, various combinations of pyridine and 3-pyridinesulfonic acid may also be employed as well as substantially pure 3-pyridinesulfonic acid.

In carrying out the preferred method of the present invention, substantially pure pyridine or 3-pyridinesulfonic acid is reacted with about 10%–65% oleum by weight in the presence of mercury as the sulfonation catalyst. The optimum weight of 65% oleum is found to be most desirable. It is apparent, however, that it is also possible to start with sulfuric acid or sulfuric anhydride with addition of sulfuric anhydride being made as required.

The sulfonation catalysts which may be employed in the process preferably include mercury although other catalysts such as vanadium pentoxide, mercuric sulfate, and the like are also useful. The amount of the catalysts used in the process are catalytic amounts such as up to about 10% by weight of the feed although higher amounts may also be employed.

The reaction mixture containing the sulfonation catalyst is controllably heated to a temperature of about 160° C. to about 190° C. for a period of time sufficient for the formation of a substantial quantity of 3-pyridinesulfonic acid in the reaction mixture. When 3-pyridinesulfonic acid is employed as the initial reactant, higher reaction temperatures may be employed as in the following procedure where the temperature is raised to about 200° C. to about 280° C. for a period of time sufficient for the reaction mixture to form 3,5-pyridinedisulfonic acid. When starting with pyridine, it is necessary to add additional sulfuric anhydride after the bulk of the pyridine has been converted to 3-pyridinesulfonic acid. After this conversion, the temperature of the bath may be gradually raised without loss of sulfur trioxide. The reaction mixture is thereafter cooled to about room temperature and added as a thin stream to an ice bath containing a lower alkanol such as ethanol, propanol, isopropanol, and the like. The semicrystalline precipitate immediately formed in the ice bath is found to consist primarily of 3-pyridinesulfonic acid which may then be removed by any desirable procedure such as filtration, decantation, and the like. The 3,5-pyridinedisulfonic acid initially remains in the solution from which 3-pyridinesulfonic acid has been removed and may be subsequently removed therefrom after precipitation by similar procedures as previously employed.

The ice bath containing 3,5-pyridinedisulfonic acid is permitted to stand for a period of time sufficient such as overnight at a temperature of less than about 20° C. and preferably about 0° C. to precipitate crystalline straw-colored 3,5-pyridinedisulfonic acid. The crude 3,5-pyridinedisulfonic acid is found to be of sufficient purity for conversion to other derivatives such as, for example, 3,5-dihydroxypyridine by procedures known to the art.

The following examples are included in order to further illustrate the method of the present invention.

*Example 1*

One hundred grams of pyridine are slowly added to 225 grams of 65% by weight oleum while maintaining the temperature of the additives below 40° C. After these reactants have been added, 1.5 grams of mercury are added as the sulfonation catalyst and the mixture is heated at 167–170° C. for 42 hours. The reaction mixture is then cooled to about 90–100° C. and 75 grams of 65% oleum is added. The mixture is next re-heated to a temperature of 170–180° C. for 18 hours. Thereafter, and in course of the next four hours, the temperature is raised to 240° C. where it is held for about 5 hours to complete the reaction. The mixture is cooled to a temperature of 70–80° C. and added as a thin stream, under stirring, to 100 grams of ice suspended in 600 milliliters of isopropanol. The semi-crystalline precipitate initially formed is filtered and found to consist mainly of 3-pyridinesulfonic acid. On standing overnight at 0° C., a crystalline straw-colored precipitate separates out of the filtrate and is found to be 3,5-pyridinedisulfonic acid. This precipitate is washed sparingly with a small quantity of ice cold water followed by a second wash with a small quantity of isopropanol. The crystals of 3,5-pyridinedisulfonic acid recovered are characterized by conversion of a portion to 3,5-pyridinedisulfonylchloride. A melting point of 129° C. is found to result. The crude 3,5-pyridinedisulfonic acid is also found to be satisfactory as an intermediate for the preparation of other derivatives such as 3,5-dihydroxypyridine. The crude 3,5-pyridinedisulfonic acid may also be recrystallized from a mixture of isopropanol and methanol. The recovered crystals are found to melt at a temperature of 235-237° C. The yield is found to be about 58% of theoretical.

*Example 2*

The procedure of Example 1 is repeated except that 160 grams of 3-pyridinesulfonic acid are added to 180 grams of about 65% oleum and the 42 hour heating period at 167-170° is omitted. The mixture, after addition of 1.5 grams of mercury as the sulfonation catalyst is heated for 18 hours at a temperature between 170-180° C. and the temperature thereafter raised in the course of the next 24 hours to 240° C. The temperature is held at 240° C. for five additional hours.

The reaction mixture is then further processed by the procedure of Example 1. The 3,5-pyridinedisulfonic acid recovered is found to have a melting point of about 235°-237° C. The yield is found to be about the same as in Example 1.

It is to be understood that the foregoing detailed description is given merely by way of illustration and that many variations may be made therein without departing from the spirit of the invention.

What is claimed is:

1. A method for the preparation of 3,5-pyridinedisulfonic acid comprising, reacting pyridine with sulfur trioxide in the presence of a sulfonation catalyst adding the reaction mixture to a lower alkanol ice-water bath, separating the unreacted 3-pyridinesulfonic acid by removing the crystalline precipitate from said ice-water bath, and thereafter recovering substantially pure 3,5-pyridinedisulfonic acid from the remaining reaction mixture by crystallization in a lower alkanol ice-water bath.

2. The method of claim 1 wherein the sulfonation catalyst is selected from the group consisting of mercury, vanadium pentoxide, and mercuric sulfate.

3. A method for the preparation of 3,5-pyridinedisulfonic acid comprising, reacting 3-pyridinesulfonic acid with sulfur trioxide in the presence of mercury as a catalyst.

4. A method for the preparation of 3,5-pyridinedisulfonic acid, comprising reacting pyridine with 10%-65% oleum by weight in the presence of a sulfonation catalyst adding the reaction mixture to a lower alkanol ice-water bath, separating the unreacted 3-pyridinesulfonic acid by removing the crystalline precipitate from said ice-water bath, and thereafter recovering substantially pure 3,5-pyridinedisulfonic acid from the remaining reaction mixture by crystallization in a lower alkanol ice-water bath.

5. A method for the preparation of 3,5-pyridinedisulfonic acid comprising, reacting 3-pyridinesulfonic acid with 10%-65% oleum by weight in the presence of mercury as a catalyst.

6. The method of claim 1 wherein pyridine is reacted with sulfur trioxide at a temperature of about 160° C. to about 190° C.

7. The method of claim 5 wherein 3-pyridinesulfonic acid is reacted with 10%-65% oleum at a temperature of about 200° C. to about 280° C.

References Cited by the Examiner

UNITED STATES PATENTS 2,406,972  9/1946  Tisza et al. _____ 260—290

OTHER REFERENCES

Groggins, Unit Processes in Organic Synthesis, McGraw-Hill, 1947, pp. 279-283 and 305.

Krotzschmann et al. (Tech. Univ., Dresden, Germany); Chem. Tech. (Berlin), 15 (9), 559-60 (1963).

Weissberger, Separation and Purification, 2nd Ed., Part I, 3, pp. 475-6, 1949.

WALTER A. MODANCE, *Primary Examiner.*

A. L. ROTMAN, *Assistant Examiner.*